(12) United States Patent
Brandenburg (10) Patent No.: US 8,567,274 B2
(45) Date of Patent: Oct. 29, 2013

(54) CONTROL DEVICE FOR AN AUTOMATED GEAR SHIFT TRANSMISSION

(75) Inventor: Markus Brandenburg, Esslingen (DE)

(73) Assignee: Daimler AG, Stuttgart (DE)

( * ) Notice: Subject to any disclaimer, the term of this patent is extended or adjusted under 35 U.S.C. 154(b) by 242 days.

(21) Appl. No.: 13/136,121

(22) Filed: Jul. 22, 2011

(65) Prior Publication Data

US 2011/0314944 A1 Dec. 29, 2011

Related U.S. Application Data

(63) Continuation-in-part of application No. PCT/EP2009/009042, filed on Dec. 16, 2009.

(30) Foreign Application Priority Data

Jan. 23, 2009 (DE) .................... 10 2009 005 756

(51) Int. Cl.
| | |
|---|---|
| F16H 3/08 | (2006.01) |
| F16H 3/04 | (2006.01) |
| F16H 59/00 | (2006.01) |
| F16H 61/00 | (2006.01) |
| F16H 63/00 | (2006.01) |

(52) U.S. Cl.
USPC .............................. 74/335; 74/330

(58) Field of Classification Search
USPC .................. 74/330, 335, 473.1, 346
See application file for complete search history.

(56) References Cited

U.S. PATENT DOCUMENTS

2008/0127760 A1 * 6/2008 John et al. ...................... 74/335

FOREIGN PATENT DOCUMENTS

| DE | 41 17 736 | 5/1992 |
|---|---|---|
| EP | 1 635 091 | 3/2006 |
| JP | 03 163265 | 7/1991 |
| JP | 09 190233 | 7/1997 |

* cited by examiner

Primary Examiner — Ha D Ho
Assistant Examiner — Emily Cheng
(74) Attorney, Agent, or Firm — Klaus J. Bach (57) ABSTRACT

In a control arrangement for an automated gear shift transmission, particularly a dual clutch transmission with a partial transmission having two gears which must not be simultaneously engaged, simultaneous engagement of the two gears of the partial transmission is prevented by a gear actuation system which has a first and a second gear slide wherein a second gear shift control pressure of the second gear slide counteracts the first gear shift control pressure of the first gear slide so that the first gear slide is blocked by the second gear shift control pressure.

10 Claims, 3 Drawing Sheets

CONTROL DEVICE FOR AN AUTOMATED GEAR SHIFT TRANSMISSION

This is a Continuation-In-Part Application of pending international patent application PCT/EP2009/009042 filed Dec. 16, 2009 and claiming the priority of German application 10 2009 005756.0 filed Jan. 23, 2009.

BACKGROUND OF THE INVENTION

The invention relates to a control arrangement for an automated gear shift transmission, particularly a dual clutch transmission with first and second partial transmissions in which different gears can be engaged by engaging different idle gears with separate clutches for the two partial transmissions.

EP 1 635 091 A1 discloses a hydraulic control device for an automated gear shift transmission in the form of a dual clutch transmission with two partial transmissions for a motor vehicle. The different gears of the dual clutch transmission can be engaged and disengaged by means of shift devices in the form of shift cylinders acting in either axial direction. The gear to be engaged or disengaged is determined by means of a group selection, an actuator selection and an actuator chamber selection.

JP 03 163265 A describes a hydraulic control device for an automated geared transmission with a hydraulic torque transducer as start-up element. The individual gears of the geared transmission can be engaged or disengaged by respectively a shift element that can be actuated hydraulically. In order to prevent a simultaneous actuation of two shift elements, a second gear control pressure of a second gear slide counteracts a first gear slide.

In these transmissions, two gears of a partial transmission must not be simultaneously engaged. This would lead to a blocking of the transmission and thus to uncontrollable drive states of the motor vehicle and to damages of the transmission.

It is the object of the present invention to provide a control device for an automated gear shift transmission in which a simultaneous engagement of two gears of a partial transmission is prevented in a simple manner.

SUMMARY OF THE INVENTION

In a control arrangement for an automated gear shift transmission, particularly a dual clutch transmission, with a partial transmission having gears which must not be simultaneously engaged, simultaneous engagement of two gears of the partial transmission is prevented by a gear actuation system which has a first and a second gear slide wherein a gear shift control pressure of the second gear slide counteracts the first gear shift control pressure of the first gear slide so that the first gear slide is blocked by the second gear shift control pressure.

The gear actuation system has a first and a second gear slide, which are respectively assigned to a first and a second shift device of a first partial transmission. Actuation pressure can be applied to the respectively assigned shift device by means of the gear slide. The associated gear slide has to be brought into a corresponding position by means of a gear actuation pressure and a shift device has to be selected herefor. By means of a first and a second gear control valve particularly in the form of magnetic valves, which are respectively assigned to the first and the second gear slide, a first or a second gear control pressure can be adjusted at the first or the second gear slide. The second gear control pressure of the second gear slide counteracts the first gear control pressure of the first gear slide, whereby the first gear slide is blocked by the second control pressure.

It is thereby ensured that, as soon as the second shift device is selected by means of a corresponding adjustment of the second gear control pressure that the first shift device can no longer be selected. It is thus prevented in a simple manner that the first shift device is also still subsequently selected after the selection of the second shift device and two gears of the first partial transmission are thus engaged. The gear actuation system is particularly designed in such a manner that the second gear slide can be blocked by the first control pressure. In the case that the geared transmission is designed as a dual clutch transmission, the shift devices of a second partial transmission present then have corresponding blocks.

A safe blocking of the gears of a partial transmission is thereby achieved in a simple manner. Additionally, further functions within the control device can also be realized by means of the gear control pressures. For example, the first gear control pressure can be increased after the second shift device was selected by means of the second gear control pressure, without the first shift device having to be selected additionally to the second shift device. The behavior of a lubricating cooling system can thereby for example be influenced in this state by means of the first gear control pressure.

The control device is particularly designed as a hydraulic control device, so that particularly oil is used as actuation fluid. It is however also possible that the control device is designed as a pneumatic control device with air as actuation fluid.

The gear actuation system is designed according to the invention in such a manner that the second shift device is selected when the second gear control pressure exceeds a first pressure threshold. The second gear control pressure acts against a spring, so that the respective pressure limit results by the properties of the spring. When exceeding a second pressure threshold by the second gear control pressure, an adjustment of an actuation pressure at the first shift device (18) is no longer possible by means of the first gear control pressure. The second pressure threshold can be the same or smaller than the first pressure threshold. A safe blocking of the first shift device is provided thereby.

The first gear control pressure particularly acts against a spring. Thereby, not only the second gear control pressure, but also the spring force acts against the first gear control pressure. A lower amount of the second gear control pressure is thereby sufficient to prevent a selection of the first shift device.

In a particular arrangement of the invention, the first gear slide of the gear actuation system is designed in such a manner that a first actuation area of the first gear control pressure is smaller than a second actuation area of the second gear control pressure. A lower level of the second gear control pressure is thereby sufficient to prevent a selection of the first shift device.

The mentioned spring and/or the area ratio of the first and second effective areas are particularly designed in such a manner that, with the adjustment of the minimum pressure as second gear control pressure necessary for the selection of the second shift device, the maximum adjustable first gear control pressure is not sufficient to additionally select the first shift device.

In an arrangement of the invention, the gear actuation system has a ratchet device, which arrests a position of the shift devices when an actuation pressure is not present. Thereby, an actuation pressure is not necessary for maintaining an adjusted position. Thereby, uncontrollable changes of the positions of the shift devices that are not selected are prevented on the one hand and no pressure has to be applied for maintaining the position of the selected shift device on the other hand, which would detrimentally affect the efficiency of the control device. The respective gear control pressure of the selected shift device however remains unchanged, in order to ensure the described blocking in this manner. The ratchet device can for example be arranged directly at the gear slide valve or also at a shift fork.

In an arrangement of the invention, the first gear slide valve, which is assigned to a first shift device and by means of which a actuation pressure can be applied to the first shift device, has a first and a second supply input for the first and second movement direction of the piston. A connection of the supply inputs can be made or interrupted by means of the first gear slide valve. A supply pressure slide valve, by means of which a supply medium under pressure can be directed to the gear slide valve, has a first and a second supply output, which are respectively connected to the first and second supply input of the gear slide valve. The supply pressure slide valve is designed in such a manner that it can guide a supply fluid optionally to one of the two supply outputs. It is not possible that a supply pressure is present simultaneously at both supply outputs. Thereby, the first or the second movement direction of the pistons can be selected by means of the supply pressure slide valves and the first shift device can by selected by means of the first gear slide, whose cylinder than moves into the selected direction or is biased in that direction.

The gear shift transmission is particularly designed as a dual clutch transmission with a first and a second partial transmission. The gear actuation system has a third and fourth fluid-actuated shift device and a third and fourth gear slide valve for actuating the second partial transmission. The third and the fourth gear slide valves respectively have two supply inputs, which are also connected to the supply outputs of the supply slide. The functional manner of the third and the fourth gear slide valves is thereby identical to the one of the first and the second gear slide valves for operating the gear shift devices.

Thereby, the first or the second movement direction of the pistons can be selected by means of the supply pressure slide valves and one or two of the shift devices by means of the gear slide valves.

The adjustment of the respective gear slide valves takes place by means of fluid control pressures, which are adjusted by valves, particularly magnetic valves. The magnetic valves are shift or magnetic control valves.

In an arrangement of the invention, the supply pressure slide is supplied with an operating fluid under pressure. The gear actuation system has an accessible supply valve particularly in the form of a magnetic control valve assigned to the supply pressure slide valve, by means of which an operating fluid pressure can be adjusted at the supply pressure slide. By means of this operating fluid under pressure a supply pressure derived from the work pressure can be adjusted at one of the supply outputs. Thereby, not only a movement direction of the cylinders can be selected with by supply pressure slide, but the amount of the actuation fluid can also be controlled. The course of a shift can thereby be determined in a very exact manner. Shift valves are then sufficient for the selection of the shift devices. When using magnetic control valves for the adjustment of the gear shifting pressures, a volume flow into the cylinders can be adjusted and a speed of the pistons in the cylinders during shifting can be controlled.

The invention will become more readily apparent from the following description of several embodiments on the basis of the accompanying drawings, in which the same or functionally the same elements are provided with identical reference numerals.

DESCRIPTION OF PARTICULAR EMBODIMENTS

Figure 1:
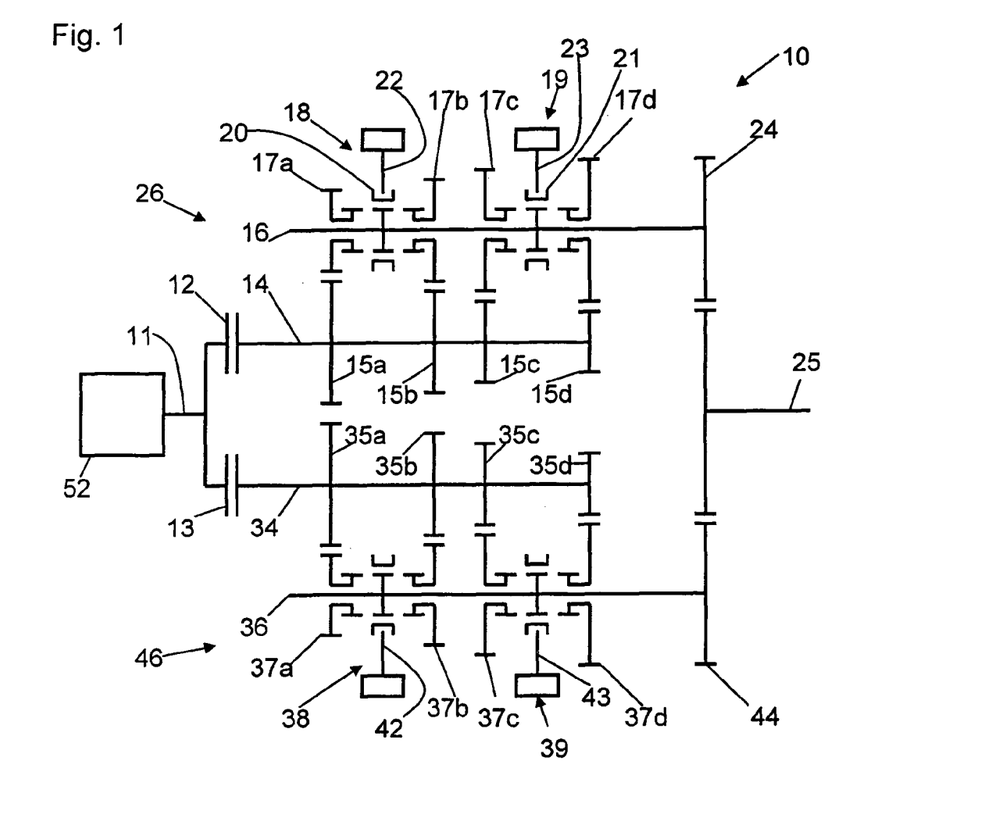
FIG. 1 shows a schematic depiction of a dual clutch transmission of a motor vehicle.

According to FIG. 1, an automated transmission in the form of a dual clutch transmission 10 for a motor vehicle with 7 forward and one reverse gear are connected via a drive shaft 11 to a drive machine 52 for example in the form of an internal combustion engine. The drive shaft 11 is in operative connection with a first and a second clutch 12, 13. The clutches 12, 13 serve as start-up clutches and are particularly designed as wet friction clutches, which can be actuated hydraulically. The clutch 12 is additionally in operative connection with a first transmission input shaft 14, on which are arranged four fixed wheels 15a to 15d. A first countershaft 16 is arranged parallel to the first transmission input shaft 14, and carries four idler wheels 17a to 17d in a rotatable manner, which respectively cog with the fixed wheels 15a to 15d of the first transmission input shaft 14. The idler wheels 17a, 17b can be coupled to the countershaft 16 in a rotationally fixed manner by means of a first shift device 18 and the idler wheels 17c, 17d by means of a second shift device 19. The shift devices 18, 19 have sliding collars 20, 21 by displacement in the axial direction of the countershaft 16, the couplings between the idler wheels 17a to 17d with the countershaft 16 can be closed and separated in a known manner. The sliding collars 20, 21 can be displaced by shift forks 22, 23. Four gears of the dual clutch transmission 10 can thereby be formed or engaged or disengaged. The first countershaft 16 is connected to an output shaft 25 of the dual clutch transmission 10 via a first output gear wheel 24.

The first transmission input shaft 14, the fixed wheels 15a to 15d, the countershaft 16, the idler wheels 17a to 17d and the first output gear wheel 24 thereby form a first partial transmission 26 of the dual clutch transmission 10.

In the same manner, a second transmission input shaft 34, fixed wheels 35a to 35d, a countershaft 36, idler wheels 37a to 37d and a second output gear wheel 44 form a second partial transmission 46 of the dual clutch transmission 10, which is connected to the second clutch 13. The four gears formed thereby can be engaged and disengaged via a third and a fourth shift device 38, 39 and associated shift forks 42, 43.

Figure 2:
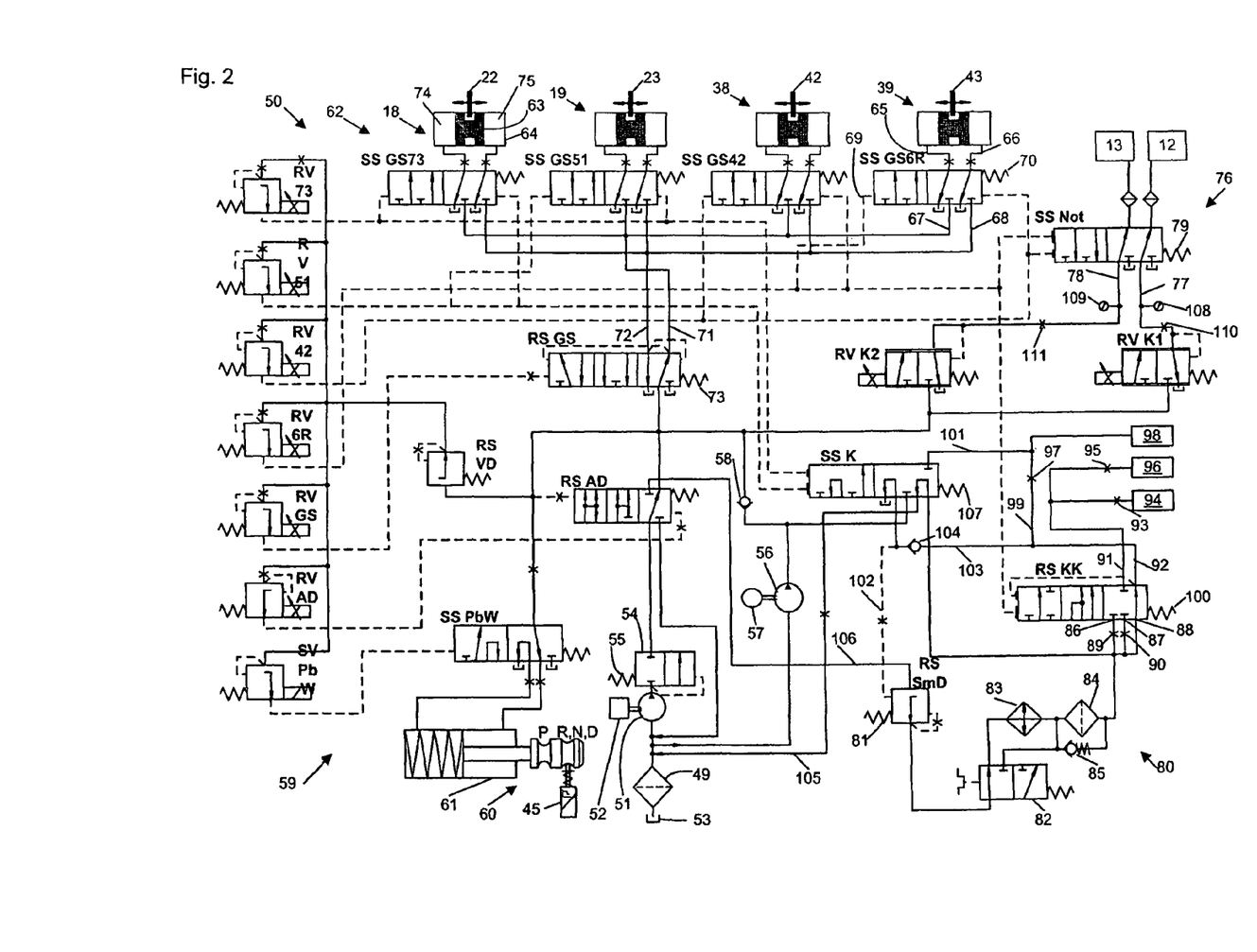
FIG. 2 shows a circuit diagram of a control device of a dual clutch transmission designed as a hydraulic control.

The clutches 12, 13 and the shift devices 18, 19, 38, 39 are accessed by a control device designed as a hydraulic control, whose circuit diagram is shown in FIG. 2.

According to FIG. 2, the hydraulic control 50 has a main pump 51, which is driven by the drive machine 52 of the motor vehicle. The main pump 51 sucks in oil from a tank 53 via a suction filter 49. The tank symbol is used at many locations of the circuit diagram. The tank symbol then always has to be understood that the associated line leads to the tank.

A separation valve 54 is arranged on the output side of the main pump 51. As long as the main pump 51 has not built up a sufficient pressure of about 1-1.5 bar, the separation valve 54 separates the main pump 51 from the remaining hydraulic system. The pump pressure is used as separation control pressure, which acts against a spring 55. Only when the pump pressure is large enough to overcome the spring force, the separation valve 54 is displaced from the shown position and the connection between the main pump 51 and the remaining hydraulic system is established. The separation valve 54 serves on the one hand to prevent an oil flow in the direction of the main pump 51 and on the other hand to ensure a necessary start-up behavior of the main pump 51.

A work pressure slide RS AD is arranged downstream from the separation valve 54, by means of which slide a work pressure can be adjusted in the hydraulic system. The work pressure slide RS AD is designed in the form of a 4/3 valve, that is, a valve with 4 connections and 3 positions. The work pressure slide RS AD is connected to the separation valve 54 via a first connection. A second connection is connected to the suction side of the main pump 51. Excess oil can be fed back directly to the main pump 51 via this connection. A third connection leads to a high pressure system, in which the work pressure is present, and a fourth connection leads to a lubricating cooling system 80.

A work control pressure together with the spring force acts on the work pressure slide RS AD against the returned work pressure. The work control pressure is adjusted by a magnetic control valve RV AD, which is accessed by an electronic control, not shown, as are all other magnetic control valves. By adjusting the work control pressure, a desired work pressure can be established of about 3 to 25 bar. The work pressure slide takes up a corresponding position to provide for this.

In the shown first position of the work pressure slide RS AD, the main pump 51 only feeds into the high pressure system, the two other connections are not established. The work pressure slide RS AD takes up this position, if the required work pressure is larger than the returned actual work pressure. This position results in particular if the main pump 51 does not deliver a sufficiently high supply pressure. The high pressure system thereby has priority over the lubricating cooling system 80. If the work pressure is sufficiently high, the work pressure slide RS AD is displaced into the second position, in which the main pump 51 feeds into the high pressure system and into the lubricating cooling system 80. A backflow to the suction side of the main pump 51 does not take place. If the work pressure is too high, the work pressure slide RS AD is displaced into the third position, in which all connections are connected to each other and a backflow to the suction side of the main pump can thus additionally also take place. By fast changes of the different positions, the required work pressure can be regulated.

The hydraulic control 50 has an additional pump 56 in addition to the main pump 51, which additional pump is driven by an electric motor 57. The electric motor 57 is accessed by the electronic control. The operation of the additional pump 56 is thereby independent from the operating state of the drive machine 52 of the motor vehicle. The additional pump 56 also sucks oil via the suction filter 49 and supplies it to the high pressure system via a non-return valve 58. The non-return valve 58 is arranged in such a manner that an oil flow in the direction toward the additional pump 56 is blocked. The additional pump 56 is connected to the third connection of the work pressure slide RS AD and thus also to the return to the work pressure slide via the non-return valve. The separation valve 54 ensures that the oil fed from the additional pump 56 cannot flow off in the direction of the main pump 51. The additional pump 56 can additionally also feed oil into the lubricating cooling system 80.

The additional pump 56 can thus support the main pump 51 with the oil supply of the hydraulic control 50, so that the main pump 51 can thereby be designed smaller. The additional pump 56 can particularly also ensure the oil supply when the drive machine 52 of the motor vehicle and thus also the main pump 52 are shut down. A so-called start-stop operation of the motor vehicle is facilitated thereby.

From the work pressure line, a constant fluid supply with a pressure of about 6.5 bar is provided via a supply pressure slide RS VD for supplying the magnetic valves of the hydraulic system 50 and is directed to the magnetic valves.

The hydraulic system 50 has a parking lock actuation system 59, by means of which a parking lock 60, only shown schematically can be engaged and disengaged. By means of the parking lock 60, a form-fit connection between an output shaft and a housing of the dual clutch transmission can be made in a known manner and a movement of the motor vehicle can thus be prevented. The parking lock actuation system 59 has a parking lock slide valve SS PbW in the form of a 5/2 valve. In the first shown position, a first side of a cylinder 61 of the parking lock 60 acting in a dual manner is connected to the work pressure. The parking lock 60 is designed therewith, which is indicated with the associated drive stages R, N, D. In the second position of the parking lock slide SS PbW, the other, second side of the cylinder 61 acting in a dual manner is connected to the work pressure, so that the parking lock 60 will be or is engaged. This is indicated with the associated drive stage P. The side of the cylinder 61 acting in a dual manner, which is not connected to the work pressure, is respectively connected to the tank via the parking lock slide SS PbW. For adjusting the two positions of the parking lock slide SS PbW, a parking control pressure acts on the parking lock slide SS PbW, which is adjusted by a magnetic shift valve SV PbW.

The current position of the parking lock can be arrested with a holding device 45. The holding device 45 is actuated in an electromagnetic manner, wherein it arrests the current position of the parking lock 60 in the non-actuated state. The parking lock 60 is designed in such a manner that it, as long as the engaged position is not arrested by means of the holding device 45, the parking lock is engaged in a pressureless state of the actuation system 59, that is, the drive stage P is activated. If the parking lock 60 is to be disengaged, as can for example be released by the driver by means of a selection lever, the holding device is actuated first and the arresting of the drive stage P is thus cancelled. The parking lock can subsequently be disengaged by the parking lock actuation system 59. After the disengagement, the parking lock 60 is arrested in the disengaged position by means of the holding device 45. The holding device 45 is supplied with electrical energy by a separate current supply, for example a battery, not shown, so that an actuation of the holding device 45 can still be actuated with an onboard network supply that does no longer function and a change of the drive stage can thus be enabled. If the parking lock actuation system 59 is pressureless at this moment, the parking lock is engaged as described above and the motor vehicle cannot be moved any longer. The parking block 60 can thereby also be engaged with a main pump 51 at standstill.

The additional pump 56 and the parking lock actuation system 59 are designed in such a manner that the oil volume flow fed by the additional pump 56 is sufficient to build up a pressure in the hydraulic system 50, which is sufficient to engage the parking lock 60. The pressure necessary for this is for example in a region between 4 and 10 bar, wherein the additional pump 56 can for example supply an oil volume flow between about 2 and 8 l/min. It is thereby possible to actuate and thus to open the parking lock 60 also without oil from the main pump 51, for example with a damage at the drive machine 52. Possible mechanical solutions, which enable a disengagement of the parking lock in such a case, are thus not necessary. Such a design of additional pump and parking lock actuation system is independent of the other construction of the hydraulic control and can also be used in hydraulic controls constructed differently and in connection with different transmission systems, as for example automated shift transmissions, automatic transmissions with planetary gears or stepless transmissions.

The hydraulic system 50 additionally has a gear actuation system 62, by means of which the shift devices 18, 19, 38, 39 can be actuated and the different gears of the dual clutch transmission can thus be engaged and disengaged by the described displacement of the shift forks 22, 23, 42, 43. The shift forks 22, 23, 42, 43 are also shown in FIG. 2. The shift devices 18, 19, 38, 39 are constructed in a virtually identical manner, so that, due to reasons of clarity, respectively only one reference numeral is given and shown in the figure representative for all shift devices 18, 19, 38, 39.

The shift forks 22, 23, 42, 43 are respectively in operative connection with pistons 63, which are arranged in a displaceable manner within cylinders 64. The pistons 63 and the cylinders 64 thus form a left pressure chamber 74 and a right pressure chamber 75. The left pressure chamber 74 is connected to a left actuation pressure line 65, the right pressure chamber 75 to a right actuation pressure line 66. By feeding oil into the left or right pressure chamber 74, 75, an actuation pressure can be applied to either side of the pistons 63, so that they can be displaced into a first and a second direction. In an outer position, the sliding collar assigned to the respective shift device is brought into a shifted position by means of the associated shift fork, so that one of the two idler wheels assigned to the respective shift device is coupled to a countershaft and a gear is thus engaged. In the center position of the pistons 63, the associated sliding collar is also in a central neutral position, so that no gear is shifted from this sliding collar. The first shift device 18 can thus either shift a $3^{rd}$ or a $7^{th}$ gear, the second shift device 19 a $1^{st}$ or a $5^{th}$ gear, the third shift device 38 a $2^{nd}$ or $4^{th}$ gear and the fourth shift device a reverse gear or a $6^{th}$ gear. Corresponding to FIG. 1, the gears 3, 7, 1 and 5 are thereby assigned to the first partial transmission 26 and the gears 2, 4 6 and the reverse gear to the second partial transmission 46. The shift devices 18, 19, 38, 39 have ratchets, not shown in FIG. 2, which ensure that an adjusted position of the pistons 63 can also be maintained without a further pressure application. A possible design of a ratchet is shown in FIG. 3.

Figure 3:
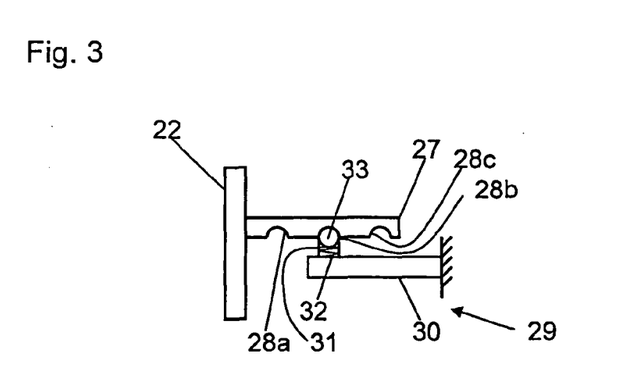
FIG. 3 shows a ratchet device of a shift device of a dual clutch transmission.
Figure 4:
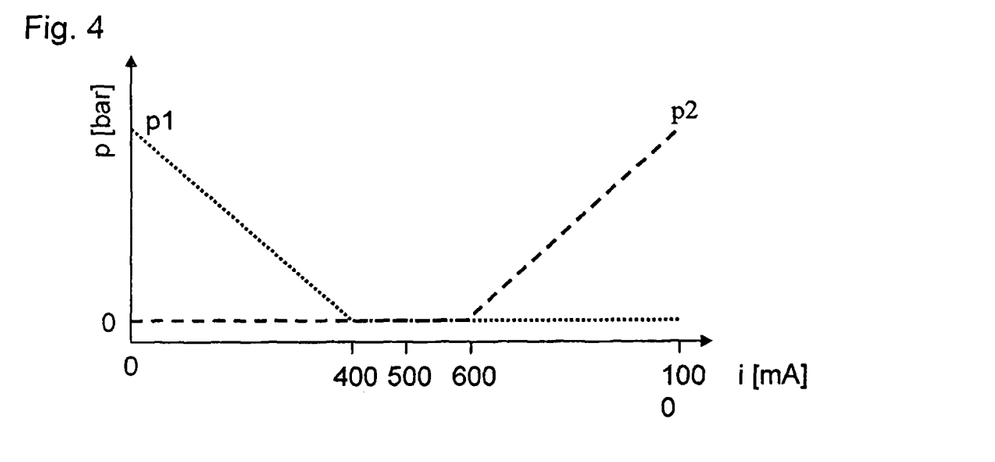
FIG. 4 shows characteristic lines of a supply pressure slide of the hydraulic control and FIG. 5 shows pressure patterns with a function check of an emergency slide of the hydraulic control.

In FIG. 3, a ratchet device 29 at the shift fork 22 of the first shift device 18 is shown in an exemplary manner. A first arm 27 is arranged at the shift fork 22 in such a manner that a right angle results between the shift fork 22 and the first arm 27. The first arm 27 has three semicircular recesses 28a, 28b, 28c. A second arm 90 fixed to the housing is arranged in parallel and opposite the recesses 28a, 28b, 28c, on which a sleeve 31 is fastened. A spring 32 is arranged in the sleeve 31, which spring presses a ball 33 against the first arm 27. The recesses 28a, 28b, 28c are arranged on the arm 27 in such a manner that in cases, in which the pistons 63 of the shift devices and thus also the shift fork 22 is in one of the outer or the center position, the ball 33 is pressed into one of the recesses 28a, 28b, 28c. The shift fork 22 is thereby fixed in these cases and the position is also stable without an actuation pressure on the pistons 63 of the shift devices and is thereby arrested.

According to FIG. 2, a first, a second, a third and a fourth gear shift control valve (gear slides) SS GS73, SS GS51, SS GS42 and SS GS6R are assigned to the shift devices 18, 19, 38, 39. The gear slides SS GS73, SS GS51, SS GS42 and SS GS6R are designed as 6/2 valves. In a first respectively shown position of the gear slides SS GS73, SS GS51, SS GS42 and SS GS6R, the left and the right actuation pressure line 65, 66 are connected to the tank. In a second position of the gear slides SS GS73, SS GS51, SS GS42 and SS GS6R, the left and the right actuation pressure line 65, 66 are connected with respectively a first and a second supply input 67, 68. An oil pressure can be applied at the first or second supply input 67, 68, which pressure can act on the pistons 63 via the gear slides SS GS73, SS GS51, SS GS42 and SS GS6R and the actuation pressure lines 65, 66.

The adjustment of the gear slides SS GS73, SS GS51, SS GS42 and SS GS6R takes place via respectively a gear shift valve in the form of a magnetic control valve RV73, RV51, RV42, RV6, which respectively apply a gear control pressure to the respective associated gear slide SS GS73, SS GS51, SS GS42 and SS GS6R. The gear slides SS GS73, SS GS51, SS GS42 and SS GS6R respectively have a control pressure input 69 for this, which is connected to the associated magnetic control valve RV73, RV51, RV42, RV6R. A spring 70 respectively acts against the respective gear control pressure, which spring biases the gear slide SS GS73, SS GS51, SS GS42 and SS GS6R into the mentioned inactive position. By an adjustment of a sufficiently high gear control pressure, which is about 3 bar with the gear slides SS GS73, SS GS51 and about 5 bar with the gear slides SS GS42 and SS GS6R, a shift device can be selected and thereby be activated and the associated piston 63 can be applied with pressure via one of the two actuation pressure lines 65, 66 and one of the two supply lines 67, 68.

In order to prevent both shift devices 18, 19 or 38, 39 of the partial transmission 26, 46 from being activated simultaneously and thus the possible engagement of two gears in one partial transmission 26, 46, a mutual blocking of the shift devices 18 and 19 or 38 and 39 is provided for. The blocking also makes it possible for the gear control pressures to fulfill additional functions.

The blocking of the first shift devices 18 by the second shift device 19 is realized in that the second gear control pressure, which is generated by the magnetic control valve RV51 and mainly serves for the second shift device, is guided to the first gear slide SS GS73 in such a manner that it additionally counteracts the first gear control pressure, which is generated by the magnetic control valve RV73 in addition to the spring force. The first shift control pressure thereby acts on a first effective area and the second shift control pressure acts on a second effective area. The second effective area of the second shift control pressure at the first gear slide GS SS73 is thereby larger than the first effective area of the first shift control pressure. As the spring force additionally acts against the shift control pressure, the first shift device 18 can, as soon as the second shift control pressure has reached a pressure threshold, no longer be activated by the shift control pressure. The mentioned pressure threshold is in any case reached when the second shift device 19 is activated.

The blocking of the second shift devices 19 by the first shift device 18 is analogously realized in that the first shift control pressure, which is generated by the regulation magnetic valve RV73 and mainly serves for the activation of the first shift device 18, is guided to the second gear slide SS GS 51 in such a manner that it counteracts the second shift control pressure generated by the regulation magnetic valve RV 51 in addition to the spring force. Regarding the effective areas of the shift control pressures at the gear slide GS SS51, the same is valid as with the gear slide GS SS73.

The first and the second shift device 18, 19 thereby block mutually.

A blocking of the third and the fourth shift device 38, 39 of the partial transmission 46 is designed analogous to this. The only difference is that, with the gear slides SS GS42 and SS GS6R, the mentioned first and second effective areas of the shift control pressures are the same. A safe blocking is achieved in these cases by a corresponding design of the spring 70. The applied spring force is in particular higher than with the gear slides SS GS 73 and SS GS51.

The oil pressures at the first and second supply inputs 67, 68 of the gear slides SS GS73, SS GS51, SS GS42 and SS GS6R are adjusted by a supply valve in the form of a supply pressure slide RS GS. The supply pressure slide RS GS is designed as a 5/3 valve, which has two supply outputs 71, 72, which are respectively connected to the supply inputs 67, 68 of the gear slides SS GS73, SS GS51, SS GS42 and SS GS6R. In addition to two outflows to the tank, the supply pressure slide RS GS still has a connection to the work pressure slide RS AD, via which it is supplied with work pressure. In the first shown position of the supply pressure slide RS GS, the first supply input 67 of the gear slides SS GS73, SS GS51, SS GS42 and SS GS6R is provided with work pressure. With a corresponding position of the gear slides SS GS73, SS GS51, SS GS42 and SS GS6R, a piston 63 of the shift devices 18, 19, 38, 39 could thereby be displaced to the right with regard to FIG. 2. In a second center position of the supply pressure slide RS GS, both supply inputs 67, 68 of the gear slides SS GS73, SS GS51, SS GS42 and SS GS6R are connected to the tank. Thereby, no actuation pressure can act on the piston 63. In a third position of the supply pressure slide RS GS, the second supply input 68 of the gear slides SS GS73, SS GS51, SS GS42 and SS GS6R is applied with work pressure. With a corresponding position of the gear slides SS GS73, SS GS51, SS GS42 and SS GS6R, a piston 63 of the shift devices 18, 19, 38, 39 could thereby be displaced to the left with regard to FIG. 2. By means of the center position of the supply pressure slide RS GS it is ensured that pressure can never be present simultaneously at both supply pressure inputs 67, 68 of the gear slides SS GS73, SS GS51, SS GS42 and SS GS6R. The supply pressure slide RS GS can thus guide the work pressure as supply pressure optionally to one of the two supply outlets 71, 72.

The accessing of the supply pressure slide RS GS takes place by a supply valve in the form of a regulation magnetic valve For carrying out a shift in the dual clutch transmission 10, a shift direction is selected by a corresponding access of the magnetic control valve RV GS via the supply pressure slide RS GS and a desired supply pressure is regulated for the gear slides SS GS73, SS GS51, SS GS42 and SS GS6R. By a corresponding access of the magnetic control valves RV73, RV51, RV42, RV6R, a shift device 18, 19, 38, 39 is additionally selected via the gear slides SS GS73, SS GS51, SS GS42 and SS GS6R, wherein it is impossible by means of the blocking to simultaneously select both shift devices 18, 19 or 38, 39 of a partial transmission 26, 46. By means of a corresponding adjustment of the gear control pressure of the selected gear slide, a through-flow amount through the gear slide into the selected pressure space 74, 75 can be controlled. It is thereby possible to vary the speed of the piston 63 during the shifting. By means of the possibility to adjust the supply and thus the actuating pressure and also to control the flow-through amount into the pressure chamber 74, 75, the shifting procedure in the dual clutch transmission 10 can be predetermined in an exact manner.

The hydraulic system 50 additionally has a clutch control system 76, by means of which the clutches 12, 13 can be actuated, that is, applied with actuation or clutch pressure. The clutches 12, 13 can thereby be closed and opened or also be held in a defined slip position.

The clutch control system 76 is also supplied with work pressure from the work pressure slide RS AD. A first clutch slide RV K1 is assigned to the first clutch 12 and a second clutch slide RV K2 is assigned to the second clutch 13, which are both supplied with work pressure. The clutch sliders RV K1 and RV K2 are designed as directly accessed regulation slides, which are accessed by the electronic control. The clutch sliders RV K1 and RV K2 are designed as 3/2 valves and can regulate a desired clutch pressure at the first and second clutch 12, 13 via respectively a first and second clutch line 77, 78. The clutch lines 77, 78 can thereby either be connected to the work pressure or to the tank for this.

An emergency slide SS Not is arranged between the clutch sliders RV K1 and RV K2 and the clutches 12 and 13, by means of which emergency slide the clutch lines 77, 78 can be separated into an emergency position of the emergency slide SS Not and the clutches 12 and 13 can be connected to the tank. In this case, the clutch pressure at the clutches abruptly falls to zero and the clutches 12 and 13 are thereby opened. The electronic control can thereby for example initiate an emergency opening with a recognized error in the dual clutch transmission 10 and abruptly open the clutches 12 and 13. The emergency slide SS Not is designed as a 6/2 valve for this, on which an emergency control pressure acts against a spring 79. If the force acting through the emergency control pressure is smaller than the force of the spring 79, the emergency slide SS Not is pressed into the shown position, the normal position, in which the connection between the clutch slides RV K1, RV K2 and the clutches 12, 13 is made.

The shift control pressures of the gear slides SS GS42 and SS GS6R act together as the emergency control pressure, which slides primarily serve for the selection of one of the shift devices 38, 39 of the second partial transmission 46. The effective area of the emergency control pressure and the spring 79 are designed in such a manner that the maximum gear control pressure of one of the two gear slides SS GS42 and SS GS6R alone is not sufficient to displace the emergency slide SS Not from the shown position and to cause an emergency opening. For initiating an emergency opening, the two associated magnetic control valves RV 42 and RV 6R thus have to be accessed. The design is particular in such a manner that both magnetic control valves RV 42 and RV 6R have to supply nearly their maximum pressure.

A design would also be possible, where a shift control pressure alone could cause an emergency opening. In this case, the necessary pressure for the emergency opening would have to be clearly above the pressure necessary for an activation of the corresponding shift device. For example, a pressure of 3 bar could be sufficient for an activation of the shift device, and a pressure of 5 bar could be necessary for an emergency opening. In this case, only one shift control pressure could be directed to the emergency slide as emergency control pressure.

The emergency slide SS Not is never shifted in a normal operation of the dual clutch transmission. Thereby, the danger exists that a possible defect at the emergency slide SS Not would only be determined if an emergency opening should take place. In order to avoid this, a functional check of the emergency slide SS Not is carried out by the electronic control. For this, a pressure build-up behind the first and/or second clutch slide RV K1 and RV K2 is compared with the two positions of the emergency slide SS Not in a neutral position of the dual clutch transmission 10, that is, a state, in which no gear is engaged in the dual clutch transmission 10, that is, for example in the drive stage N or P. For this, a clutch actuation pressure is increased abruptly from zero to a fixed value. The pressure pattern necessary for the comparison can be measured by means of pressure sensors 108, 109, which are respectively arranged between the first and the second clutch slide RV K1, RV K2 and the emergency slide SS Not.

If the emergency slide SS Not is in the emergency position, the clutch lines 77, 78 are closed by the emergency slide SS Not. In the normal position however, the clutch lines 77, 78 are connected to pressure chambers, not shown, of the clutches 12, 13. Oil that is fed in the normal position of the emergency slide Not from the clutch slides RV K1 and RV K2 to the clutch lines 77, 78 can thereby be distributed to a clearly greater volume. The pressures in the clutch lines 77, 78 in the normal position of the emergency slide SS Not thereby increase slower or more evenly than in the emergency position. So that the pressure build-up is clearly distinguished with the two positions of the emergency slide SS Not, in particular no throttles should be arranged between the pressure sensors 108, 109 and the clutches. A throttle arranged at this position would hinder the oil flow into the clutches 12, 13 in the normal position of the emergency slide SS Not and thus generate a back pressure. This back pressure would be measured by the pressure sensors 108, 109. The difference with the pressure build-up in the two positions would thereby only be small and could possibly not be recognized safely. For this reason, throttles 110 and 111 are respectively arranged between the pressure sensors 108, 109 and the clutch slides RV K1 and RV K2.

The throttles can also be arranged between the work pressure slide RS AD and the clutch slides RV K1 and RV K2. It is also possible that the throttles are arranged in such a manner that they are respectively arranged between branch-offs of the return lines of the clutch slides RV K1 and RV K2 and the clutch slides RV K1 and RV K2.

For the functional check of the emergency slide SS Not, the clutch slides RV K1 and RV K2 are first accessed in the normal position of the emergency slide SS Not and subsequently with an identical access in an accessed emergency position of the emergency slide SS Not. The pressure pattern or the pressure build-up with the two accesses is subsequently compared. If the pressure build-up is faster or steeper with an accessed emergency position of the emergency slide SS Not, the adjustment of the emergency position was successful and the function of the emergency slide SS Not is ensured. A simple method for determining a variable for the different gradients is to measure the time span up to reaching a certain pressure value. If the difference between the time span with an accessed normal position is longer by an adjustable period than the time span with an accessed emergency position, it is concluded therefrom that the emergency slide SS Not actually has taken up the accessed emergency position. For the functional check, it is sufficient to compare only the pressure build-up of a pressure and correspondingly to only access one clutch slide RV K1 or RV K2.

Figure 5:
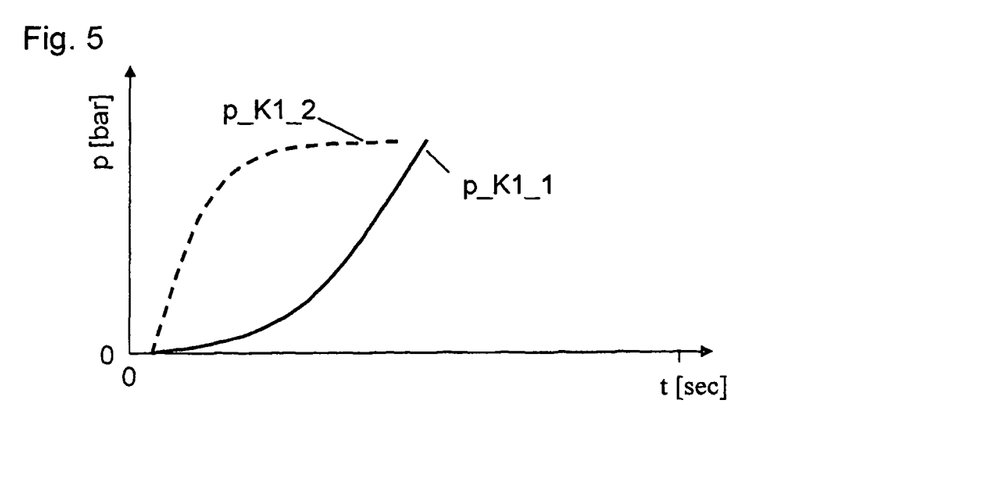

In FIG. 5 are shown two pressure patterns of the pressure between the first clutch slide RV K1 and the emergency slide SS Not over time in an exemplary manner. The continuous line (p_K1_1) shows the pressure build-up with a normal position of the emergency slide SS Not, the dashed line (p_K1_2) the pressure build-up with an accessed emergency position. As can clearly be seen, the pressure with the normal position of the emergency slide SS Not increases clearly slower and more even. The pressure build-up with the normal position has a principally concave pattern and the pressure build-up in the emergency position a principally convex pattern. The electronic control can recognize therewith that the accessed emergency position was actually adjusted and the emergency thus functions.

The lubricating cooling system 80 of the hydraulic system 50 is supplied mainly with oil by the work pressure slide RS AD via its fourth connection via a supply channel 106. This oil is guided to a lubricating pressure slide RS SmD, which regulates a lubricating pressure in the lubricating cooling system. The height of the lubricating pressure results on the one hand by the design of a spring 81, which acts against the returned lubricating pressure and on the other hand, in dependence upon a lubricating control pressure, which also acts against the spring 81. The spring 81 is for example designed in such a manner that a lubricating pressure of about 3.5 bar adjusts without additional lubricating control pressure. The adjustment of the lubricating control pressure is described below.

From the lubricating pressure slide, the oil reaches a thermostat valve 82 known per se, by means of which the oil is conducted in dependence on an oil temperature either over an oil cooler 83 or directly to an oil filter 84 arranged behind the oil cooler 83. For the faster heating of the dual clutch transmission 10, the oil cooler 83 is bypassed at low oil temperatures. Parallel to the oil filter 84, a non-return valve is arranged in such a manner that the oil can also flow over the non-return valve 85 past the oil cooler 84 when the back pressure in front of the oil filter 84 exceeds a certain value.

A first cooling slide SS K and a second cooling slide RS K are arranged in parallel behind the oil cooler 84/non-return valve 85, so that both are supplied with oil via the oil cooler 84/non-return valve 85. The second cooling slide RS KK is designed as a 5/3 valve. Three inputs 86, 87, 88 of the cooling slide RS KK are connected to the oil cooler 84/non-return valve 85, wherein the first input 86 is supplied with oil via a first throttle 89, the second input 87 via a second throttle 90 and the third input directly, that is, without interconnection of a throttle. The first baffle 89 thereby particularly has a larger diameter than the second throttle 90.

A first output 91 of the cooling slide RS KK is connected to a cooling system 94 of a wheel set of the dual clutch transmission 10 via a third throttle 93 and to a cooling system 96 of the electronic control via a fourth throttle. A second output of the cooling slide RS KK is connected to a cooling system 98 of the clutches 12, 13 via a first cooling channel 99, in which is arranged a fifth throttle 97. With the selection of the diameters of the mentioned throttles 89, 90, 93, 95 and 97, the division of the oil flows to the cooling systems can be influenced and designed.

In a first shown position of the cooling slide RS KK, only the third input 88 is connected to the second output 92 and thus to the cooling system 98 of the clutches 12, 13. The other inputs and outputs do not have a connection. Thereby, no oil flows into the cooling systems 94 and 96 in this first position of the cooling slide RS KK. In a second, center position of the cooling slide RS KK, the first and the second input 86, 87 are together connected to the first output 91 and thus to the cooling systems 94 and 96. Additionally, the third input 88 is connected to the second output 92, as in the first position. In a third position, only the second input 87 is connected to the first output 91. In this position, no oil flows to the cooling system 98 of the clutches 12, 13 over the cooling slide RS KK.

The position of the cooling slide RS KK results from a force of a spring 100 against which the returned pressure at the second output 92 of the cooling slide RS KK and a second cooling control pressure. The fourth shift control pressure of the regulation magnetic valve RV 6R is used as the second cooling control pressure, whose main function is to activate the fourth shift device 39. Since about 5 bar are necessary for the activation as described, the pressure area below can be used for accessing the second cooling slide RS KK. With a small second cooling control pressure and a small pressure at the second output 92, the cooling slide RS KK is in the first position. By means of a high second cooling control pressure, the third position can be adjusted. By means of the return of the pressure at the second output 92, a pressure value given by the second cooling control pressure and the spring 100 at the second output 92 and thus in the first cooling channel 99 to the cooling system of the clutches can be regulated.

The first cooling slide SS K is designed as a 6/2 valve without return. It is supplied with an oil volume flow by the oil cooler 84/non-return valve 85. The oil amount available for this depends among other things on the position of the second cooling slide RS KK. If a lot of oil can flow off via the second cooling slide RS KK, the oil volume flow to the first cooling slide SS K is smaller than in the case in which little oil can flow off via the second cooling slide RS KK. The oil amount flowing off via the second cooling slide RS KK depends on its position. The oil volume flow from the oil cooler 84/non-return valve 85 to the first cooling slider SS K can thus be influenced by means of the second cooling slide RS KK.

In a first shown position of the first cooling slide SS K, the oil coming from the oil cooler 84/non-return valve 85 is directed to the suction side of the main pump 51 via a non-return valve. Excess oil from the lubricating cooling system 80 can thereby pumped directly back into the high pressure cycle. All other connections either have no connection in this position or are connected to the tank. In a second position of the cooling slide SS K, the oil coming from the oil cooler 84/non-return valve 85 is conducted to the cooling system 98 of the clutches 12, 13 via a second cooling channel 101, which is arranged in parallel to the first cooling channel 99. The connection to the suction side of the main pump 51 is interrupted in this case. Additionally, a connection between the additional pump 56 and the lubricating cooling system is made via the first cooling slide SS K in its second position. On the one hand, a possible pressure of the additional pump 56 is directed as lubricating control pressure to the lubricating pressure slide RS SmD via a control channel. If the additional pump 56 builds up an oil pressure, it leads to an increase of the lubricating pressure in the lubricating cooling system 80 and thus also to an increase of the oil amount available for the cooling and lubrication. The oil fed by the additional pump 56 is additionally supplied to the first cooling channel 99 and thus to the cooling system 98 of the clutches 12, 13 via an additional oil channel 103, which partially corresponds to the control channel 102. The non-return valve 104 is arranged in such a manner that oil can only flow from the additional pump 56 in the direction of the first cooling channel 99. The oil amount available for the cooling of the clutches 12, 13 is thereby increased.

A first cooling control pressure acts on the first cooling slide SS K, which is composed of the first and the second gear control pressure of the magnetic control valves RV73 and RV51. These gear control pressures mainly serve for the selection of the first and the second shift device 18, 19 of the first partial transmission 26. The first cooling control pressure acts against a spring 107, which is designed in such a manner that a change from the described first into the second position of the first cooling slide SS K takes place at a pressure of about 5 bar. As a substantially smaller pressure is sufficient for the selection of the first or the second shift device 18, 19, as described above, the selection of a shift device 18, 19 can take place without this having an effect on the position of the first cooling slide.

If the first cooling slide SS K is to be brought into the second position without one of the two shift devices 18 or 19 to be selected, a pressure value of about 2.5-2.7 bar is adjusted as the first and second gear control pressure by the regulation magnetic valves RV73 and RV51. 2.5-2.7 bar. These gear control pressures are respectively too small for selecting the first or second shift device 18 or 19, but together they are sufficient to bring the first cooling slide SS K into the second position.

The lubricating cooling system 80 enables thereby to shift between different cooling types. In a first cooling type, where all cooling systems 94, 96, 98 are supplied with a basic oil amount, the first cooling slide SS K is in the shown first position, so that oil is directed back from the lubricating cooling system 80 to the suction side of the main pump 51. By means of the of the fourth shift control pressure, which acts as the second cooling control pressure at the second cooling slide RS KK, a desired pressure is regulated in the first cooling channel 99 to the cooling system 98 of the clutches 12, 13. The second cooling slide RS KK is thereby in a regulation position between the described first and second position. The first and the second baffle 89, 90 are particularly designed in such a manner that the largest amount flows back to the main pump 51 and the smallest amount in the direction of the cooling systems 94 and 96.

In a second cooling type, in which the cooling system 98 of the clutches 12, 13 is not supplied with oil, the first cooling slide SS K is also in the shown first position. The second cooling slide RS KK is placed into the described third position by means of the second cooling control pressure, in which no oil flows into the direction of the cooling system 98 of the clutches 12, 13.

In a third cooling type, in which an increased oil amount is introduced into the cooling system 98 of the clutches 12, 13, the first cooling slide SS K is in the described second position due to a corresponding cooling control pressure. Thereby, no oil is returned from the lubricating cooling system 80 to the suction side of the main pump 51. The oil flowing from the oil filter 84/non-return valve 85 in the direction of the first cooling slide SS K is guided to the cooling system 98 of the clutches 12, 13 via the second cooling channel 101. The distribution of the oil flowing over the second cooling slide RS KK can be adjusted via the second cooling control pressure. The additional pump 56 is thereby not in operation.

A fourth cooling type, into which a very large oil amount is conducted into the cooling system 98 of the clutches 12, 13, is only distinguished from the third cooling type in that the additional pump 56 additionally feeds oil into the lubricating cooling system 80. Thereby, the lubricating pressure is increased as described above by means of the lubricating pressure slide RS SmD, which leads to an increase of the oil amount available in the lubricating cooling system 80. Additionally, oil flows from the additional pump 56 to the cooling system 98 of the clutches 12, 13 via the additional oil channel 103. A maximum oil amount is thereby supplied to the cooling system 98 of the clutches 12, 13.

The selection of a cooling type by the electronic control mainly takes place by the cooling requirement of the clutches 12, 13.

What is claimed is:

1. A control arrangement for an automated gear shift transmission, particularly a dual clutch transmission for a motor vehicle with a first partial transmission(26) with a first main shaft (14), and a first counter shaft (16) with different idler gears which can be engaged with the first counter shaft (16) by coupling the idler gears (17*a*, 17*b*, 17*c*, 17*d*) to the counter shaft (16), the control arrangement including a gear actuation system (62), having
  a first and a second fluid-actuated shift device (18, 19), by means of which either one of two of the idler gears (17*a*, 17*b*) can be coupled to the first counter shaft (16),
the gear actuation system (62) further including
  a first and a second gear slide (SS GS73, SS GS51), which are respectively assigned to the first and the second fluid-activated shift device (18, 19) and by means of which an actuation pressure can be applied to the respective assigned fluid-activated shift device (18, 19) in dependence on a first and a second gear shift control pressure,
  a first and a second accessible shift valve (RV 73, RV 51) assigned respectively to the first and the second gear slides (SS GS73, SS GS51) and by means of which respectively the first and the second gear shift control pressure can be adjusted at the respective assigned gear slide (SS GS73, SS GS51), so that
  the second gear shift control pressure of the second gear slide (SS GS73) counteracts the first gear shift control pressure on the first gear slide (SS GS51) and the first gear slide (SS GS73) can thus be blocked by the second gear shift control pressure,
  the gear actuation system (62) being designed in such a manner that the second fluid-activated shift device (19) is selected when the second gear shift control pressure exceeds a first pressure threshold and
  the first gear slide (SS GS73) of the gear actuation system (62) being designed in such a manner that, when a second pressure threshold is exceeded by the second gear shift control pressure, an adjustment of an actuation pressure at the first gear shift device (18) by means of the first gear shift control pressure is no longer possible.

2. The control arrangement according to claim 1, wherein the first gear slide (SS GS73) of the gear actuation system (62) has a spring (70) which counteracts the first gear shift control pressure in addition to the second gear shift control pressure.

3. The control arrangement according to claim 1, wherein the first gear slide (SS GS73) of the gear actuation system (62) is designed in such a manner that a first effective value of the first gear shift control pressure is smaller than a second effective value of the second gear shift control pressure.

4. The control arrangement according to claim 1, wherein the second gear slide (SS GS51) of the gear actuation system (62) can be blocked by the first gear control pressure.

5. The control arrangement according to claim 4, wherein the gear actuation system (62) has
  a third and a fourth fluid-actuated gear shift device (38, 39),
  a third and a fourth gear slide (SS GS42, SS GS6R),
  a third and a fourth accessible valve (RV 42, RV 6R), by means of which
  a third and a fourth gear shift control pressure can be adjusted for actuating a second partial transmission (46), and the third gear slide (SS GS42) can be blocked by the fourth gear shift control pressure and the fourth gear slide (SS GS6R) by the third gear shift control pressure.

6. The control arrangement according to claim 1, wherein the gear actuation system (62) has a ratchet device (29), which arrests a position of the first and second fluid-activated shift devices (18, 19) when an actuation pressure is not present.

7. The control arrangement according to claim 1, including further a supply pressure slide (RS GS), by means of which a supply pressure can be supplied to the first gear slide (SS GS73), wherein
  the first gear slide (SS GS73) has a first and a second supply input (67, 68) for a first and a second movement direction of a piston (63) of the first fluid-activated shift device (18),
  a connection of the supply inputs (67, 68) to the first fluid-activated shift device (18) can be made and interrupted by means of the first gear slide (SS GS73),
  the supply pressure slide (RS GS) has a first and a second supply output (71, 72), which are respectively connected to the first and the second supply input (67, 68) of the gear slide (SS GS73) and
  the supply pressure slide (RS GS) is designed in such a manner that it can optionally direct a supply pressure to one of the two supply outputs (71, 72).

8. The control arrangement according to claim 7, wherein the gear actuation system (62) has a second fluid-activated gear shift device (19) and an associated second gear slide (SS GS51) and the second gear slide (SS GS51) has two supply inputs (67, 68), which are connected to the supply outputs (71, 72) of the supply pressure slide (RS GS).

9. The control arrangement according to claim 7, wherein the gear actuation system (62) has a third and fourth fluid-actuated shift device (38, 39) and a third and a fourth gear slide (SS GS42, SS GS6R) for actuating a second partial transmission (46) and the third and fourth gear slide (SS G42, SS GS6R) respectively each have two supply inputs (67, 68), which are connected to the supply outputs (71, 72) of the supply pressure slide (RS GS).

10. The control arrangement according to claim 9, wherein the supply pressure slide (RS GS) being supplied with a work pressure and the gear actuation system (62) having a supply valve (RV GS) assigned to the supply pressure slide (RS GS), by means of which a supply control pressure can be adjusted at the supply pressure slide (RS GS) and a supply pressure derived from the work pressure can be adjusted thereby in one of the supply outputs.

* * * * *